Aug. 26, 1941.   E. A. HORN   2,254,147
ELECTRIC TROLLEY CONDUIT CONSTRUCTION
Filed July 9, 1938
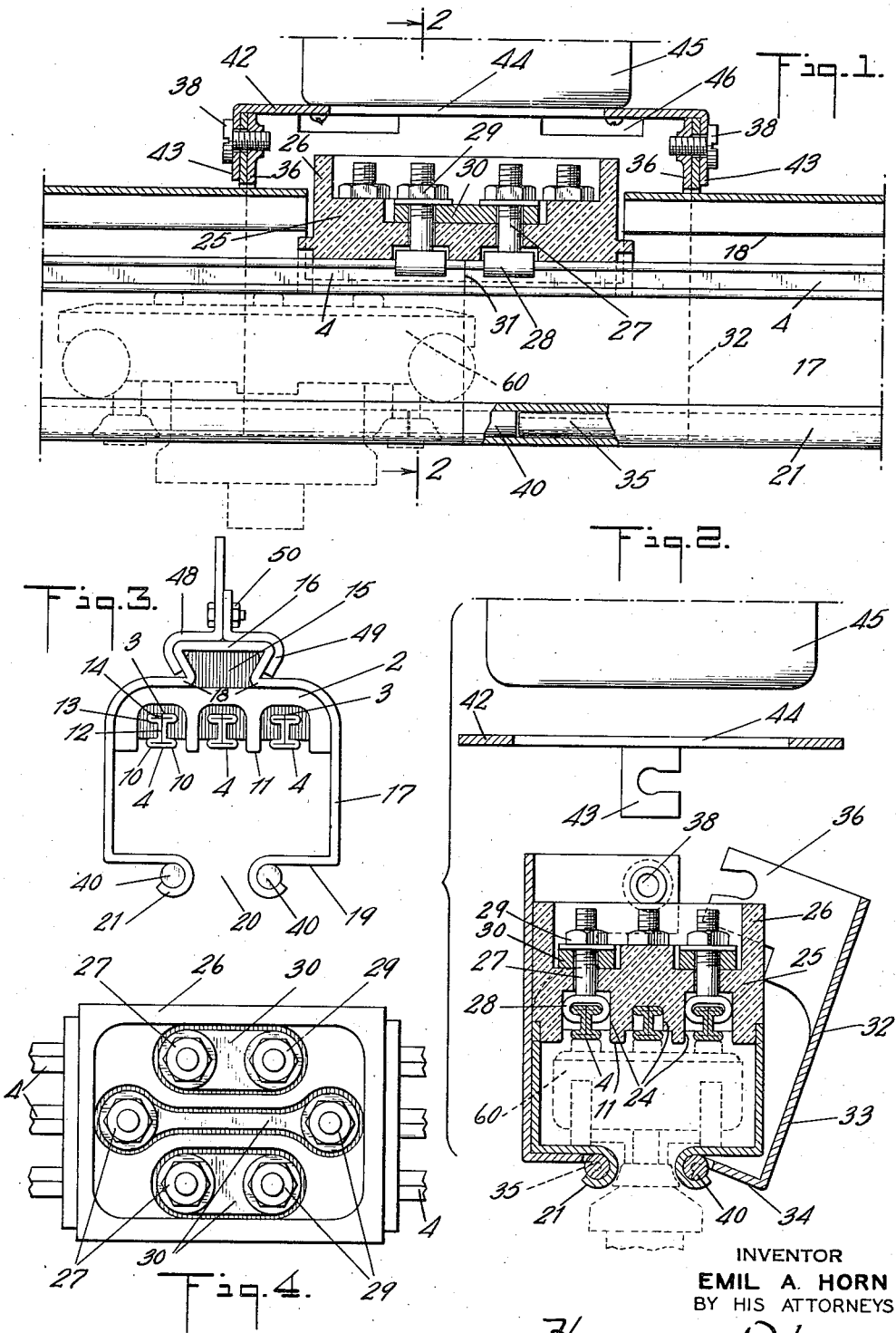
INVENTOR
EMIL A. HORN
BY HIS ATTORNEYS
Howson and Howson Patented Aug. 26, 1941

2,254,147

UNITED STATES PATENT OFFICE 2,254,147

ELECTRIC TROLLEY CONDUIT CONSTRUCTION

Emil A. Horn, Jamaica, N. Y., assignor to Feedrail Corporation, New York, N. Y., a corporation of New York Application July 9, 1938, Serial No. 218,451

19 Claims. (Cl. 191—23)

This invention relates to electric trolley conduit constructions of the type shown, described and claimed in the Glasgow Patent No. 2,026,884 of January 7, 1936, on which the present invention is an improvement.

The main objects of the present invention are to provide an improved insulating support for the bus bars, and to provide an improved construction for joining the conduit sections, including the joining of bus bars and the joining of the conduit walls, both in end to end relation.

While the present invention is particularly adapted for use in conjunction with conduits of smaller size than that contemplated in the Glasgow patent just referred to, it is to be understood that the present invention is not to be limited to any particular size of conduit.

Other objects and features of novelty will be apparent as the following description proceeds, reference being had to the accompanying drawing, in which—

Figure 1 is a longitudinal section through the joint of a conduit according to the present invention;

Figure 2 is a transverse section taken along the line 2—2 of Figure 1, parts being shown in exploded position to better illustrate the same;

Figure 3 is a transverse section through an intermediate portion of the conduit section, at a point removed from the conduit joint, showing the hanger which supports the bus bars at such intermediate points; and Figure 4 is a top plan view of the bus bar joint shown in Figures 1 and 2.

The electric trolley conduit construction according to the preferred embodiment of the present invention comprises an insulating member having bus bars secured thereto on the underside thereof, and a slotted sheet metal tube forming a conduit inclosing the insulating members and the bus bars, the bars being spaced from the conduit by the insulating member. The conduit also contains a carriage which moves longitudinally therein, and is provided with contacts engaging the bus bars.

The conduit is manufactured in sections or units, which are adapted to be joined in end to end relation to form a continuous conduit of a length to suit the installation.

Referring more particularly to the drawing, as shown in Figure 3 an insulating member forming a hanger 2 is provided, which may be conveniently molded of Bakelite, but may be constructed as desired from any other insulating material. The underside of the member 2 is provided with undercut grooves 3 which receive bus bars 4 all preferably of the construction shown in Figure 3.

The preferred form of the bus bar comprises a strip of copper or other conducting material having its side edges bent back on itself as at 10. The side edges are brought together as at 12 and then both flared outwardly forming lateral flanges 13. These flanges are again bent back on each other as at 14, the edges abutting in the center. In this manner a bus bar is formed which is approximately the shape of a rolled I-beam. The undercut grooves 3 are of a complementary T shape, so that the bus bars may be inserted therein longitudinally, leaving the lower flanges of the bus bars exposed. Ridges 11 projecting between the bus bars prevent arcing or bridging therebetween.

The conduit is formed with a cross section having reentrant portions or abutments, and the hanger is inserted longitudinally of the same, so as to be held in place thereby. In the form shown the upper side of the insulating hanger 2 is provided with a keystone or dove-tailed shape projection 15 which fits into a complementary groove 16 of the conduit which incloses the bus bars and hangers. The groove 16 is formed by a ridge rolled or folded into the central portion of the upper side of a one piece sheet metal tube 17, the top of which conforms to the contour of the top of the entire insulating member 2. The side corners of this groove form reentrant abutments 18. The side walls of the conduit are preferably vertical and terminate in inturned flanges 19. The inner edges of the flanges 19 are spaced apart thus leaving the trolley slot 20. The flanges 19 adjacent the slot 20 are provided with reinforcing beads or rolls 21.

It should be noted that with the construction just described, the insulating hanger 2 may be inserted at the end of a section with the dove-tailed portion 15 entering the undercut groove 16, along which the hanger will slide when pushed longitudinally into the section. As the bus bars 3 have similar sliding movement with respect to the hanger 2, the hanger is suspended in the conduit and the bus bars are suspended from the hanger, without the necessity of any bolts or screws requiring manipulation, and without requiring perforation of the bus bars, hanger or conduit. The bus bars may be inserted in the hangers outside of the conduit, and then the bus bars and hanger assembly may be inserted longitudinally into the conduit. However, this particular sequence of insertion is not essential.

The trolley 60 which is shown in dotted lines in Figure 1 is provided with contacts which engage the respective bus bars 3, supporting wheels which roll along the upper side of the flanges 19 which form track portions for these rollers, and side thrust rollers which move along the slot 20 and engage the beads or rollers 21. These side thrust rollers are enlarged at their lower portions, forming flanges which engage the underside of the beads 21. These flanges hold down the trolley and prevent the same from jumping.

For joining the conduit section in end to end relation, the structure shown in Figures 1, 2 and 4 is provided. Instead of the intermediate hanger 2 a joint hanger 25 is provided, the lower side of which has open rectangular grooves 24 aligned with the grooves of the intermediate hanger 2 and similarly spaced, but the upper side of which is extended upwardly forming a rectangular flange 26. Bolts 27 are mounted on the longitudinal center line of each bus bar and extend vertically through the member 25. The heads 28 of these bolts are undercut or otherwise formed with slots conforming to the flanges of the I-beam shaped bus bar 4, the insulator 25 being recessed surrounding the slotted bolt head 28, to permit the same to be aligned longitudinally with the undercut longitudinal groove 3 in the insulator 25.

With this construction, it is readily apparent that each bus bar end of a section being joined will slide longitudinally into the rectangular groove 24 of the insulator 25 and upon further movement will slide through the undercut groove in the bolt head 28. There being a pair of such bolts provided, one to receive each of the aligned bus bar ends, the two ends may be thus slid into position in abutting metal to metal relation. The nuts 29 on the bolts 27 being tightened, serve to draw up the bolt heads 28 and thereby clamp the bus bar ends securely against the abutment of the insulator 25. To insure against any arcing due to improper engagement of the abutting bus bar ends 31, a jumper 30 may bridge the two bolts 27 thereof under the nuts 29. This construction is of particular advantage for the reason that current may be supplied to the bus bars at any such joint by merely inserting a lead-in conductor under the nut 29 on a bolt 27 for each of the three bus bars.

For joining the ends of the sheet metal conduit itself, a pair of coupling plates 32 are provided. As shown in Figure 2, these plates have flat vertical side walls 33 and inturned flanges 34 which fit under the conduit flanges 19. The inner ends of the flanges 34 are rolled as at 35 forming a roll of smaller diameter which snugly fits in the roll 21 of the conduit section proper. The ends of the coupling plates 32 have transverse vertical flanges 36 which overlap above the conduit section, and are clamped together by screws 38. To hold the abutting conduit sections in abutting relation, the conduit section rolls 21 are plugged near the section end by short rods 40 which are welded inside the roll. Each coupling plate 32 has a roll 35 at each end thereof and as shown in Figure 1 the plugs 40 for both section ends are located between the coupling plate rolls 35.

The lower edges of the flanges 36 are of a contour to fit over the upper side of the conduit so that these flanges form an open rectangular box projecting above the conduit joint. To close the opening a cover plate 42 is provided, which has ears 43 bent down at each end and apertured and slotted to take the same screw 38 which clamps the coupling plates together. Thus the single pair of screws 38 cooperating with the roll 35 holds the conduit sections in abutting relation and holds the parts of the coupling joint together.

The cover plate 42 is provided with a knockout portion 44 and is also constructed and arranged to replace the cover of the usual junction box which is shown diagrammatically at 45. In fact the preferred method of mounting the coupling plates for the conduit joint, particularly where current is to be supplied to the bus bars at the joint, is to first substitute the cover plate 42 for the usual junction box cover plate, and securely attach the cover plate 42 to the junction box 45. The joint coupling plates are then applied and moved laterally so that the screws 38 may enter the slots in the ears 43. The sides of the coupling plates 42 at their edges are notched out as at 46 to clear the usual screws of the junction box and permit the conduit joint to be moved laterally into the position desired under the junction box.

The intermediate portions of the conduit may be supported by the clamp hanger shown in Figure 3, which has two jaws 48 and 49 which together conform to the shape of the keystone rib 16, the lower ends of the jaws being inclined inward thereunder. These jaws may be applied at any point in the conduit, without requiring bolt holes in the conduit, the jaws being clamped together by one or more bolts 50. Obviously, before the bolts 50 are tightened, the clamp may slide longitudinally to any desired position to accommodate the supporting structure for the hanger.

This invention embraces such modifications of the disclosed embodiment as fall within the scope of the following claims.

I claim:

1. In an electric bus bar conduit construction, an elongated sheet metal casing having a longitudinal slot and track portions parallel thereto, the sheet metal of said casing having longitudinal folds projecting inward on opposite sides with upwardly and outwardly flared sides above said slot and track portions forming a narrow central upstanding longitudinally extending hollow stiffening rib, an insulating hanger in said casing having an upward projection with laterally flared side surfaces forming supporting abutments engaging the interior of said stiffening rib above said longitudinal sheet metal folds, and longitudinally parallel bus bars mounted on said hangers and having exposed contact surfaces, said insulator having a portion below said folds sufficiently wider than the portion above said folds to receive said bus bars in transversely spaced relation.

2. In an electric bus bar conduit construction, an elongated sheet metal casing having a longitudinal slot and a longitudinal reinforcing rib opposite to said slot, the cross-sectional contour of the sheet metal of said casing top forming said rib having integral re-entrant portions, insulating hangers comprising wide transversely extending portions underlying the top of said casing and having longitudinally extending parallel bus bars mounted thereon in spaced relation, said hangers having narrow central upstanding key portions of cross-sectional contours adapted to enter said casing contour and abutments adapted to engage said integral re-entrant portions of said longitudinal reinforcing rib opposite to said slot, whereby said bus bars may be assembled on said wide portions of said hangers in said spaced relation outside of said casing, and the assembly inserted longitudinally into said casing with said hanger narrow portion abutments engaging said reinforcing rib re-entrant portions, thereby supporting said bus bar and hanger assembly from said re-entrant portions.

3. In an electric bus bar conduit construction, a pair of aligned slotted track forming conduit sections containing insulated bus bars, means for supporting said bus bars in imperforate end to end relation, comprising an insulating member having holes extending transversely to said bus bars, bolts in said holes having longitudinally slotted heads receiving and supporting said bus bar ends, nuts on the threaded ends of said bolts for drawing said heads inward to clamp said imperforate bus bar ends against said member, a jumper connecting said bolts for joining said bus bar ends and coupling means for joining said conduit sections and inclosing said joined bus bar ends.

4. In an electric bus bar conduit construction, an elongated slotted track forming conduit section containing insulated bus bars, side plates overlapping the end of said section and having transverse vertical flanges extending inwardly above said section into overlapping relation with each other and forming a box open at the top, longitudinally disposed screws passing through said transverse flanges for clamping said section end in said box, and a cover plate adapted to replace the cover of a junction box and means on said cover adapted to receive said screws upon laterally sliding movement of said open topped box for connecting said conduit box and section to said junction box.

5. In an electric bus bar conduit construction, an elongated sheet metal conduit section enclosing a plurality of longitudinally parallel bus bars insulated from each other, the side walls of said section having inturned flanges below said bus bars and spaced apart to form a slot, plates overlapping said side walls at the end of said section and having parts turned in thereunder, said inturned parts and said flanges having interlocking engagement, said plates also having vertical flanges folded inwardly and extending across over the top of said conduit section into overlapping engagement with each other and forming a box open at the top, screws passing through said flanges for securing said overlapping vertical flanges together and thereby clamping said section end in said box, and a cover plate adapted to replace the cover of a junction box and securing means on said cover plate receiving said open top upon laterally sliding movement thereof for connecting said conduit box and section to said junction box.

6. In an electric bus bar conduit construction, an elongated sheet metal casing having a longitudinal slot and track portions parallel thereto, the cross-sectional contour of said casing having re-entrant portions above said slot and track portions, means for supporting a plurality of longitudinally parallel bus bars inside said casing and insulated therefrom and from each other, means for coupling said section in end to end relation with a similar adjacent section, and a longitudinally adjustable hanger separate from said coupling means for supporting said conduit, said hanger having opposed separable inturned jaws entering said re-entrant portions.

7. In an electric bus bar conduit construction, an elongated sheet metal casing having a top wall and side walls terminating in inwardly directed flanges forming track portions spaced apart to form a slot therebetween, said top wall having the sheet metal thereof above said flanges folded to form therein at least one longitudinally extending channel of dovetail or keystone cross section open toward the interior of said casing opposite said slot and of approximately the same width, a plurality of insulators each having a corresponding keystone or dovetail shape successively insertable in longitudinally spaced relation and slidable along said channel each of said insulators having a larger portion in said casing outside of said channel, and at least two longitudinally extending bus bars secured to said larger portions of successive insulators, said insulators having their smaller portions in said channel.

8. In an electric bus bar conduit construction, a pair of aligned elongated slotted track forming conduit sections containing insulated bus bars, an insulating member in said conduit for supporting said bus bars in transversely spaced relation, said member having holes extending transversely to said bus bar, means in said holes each having an undercut longitudinal slot respectively receiving said bus bars, and means for drawing said slotted means inward to clamp said bus bars against said member in frictional contact therewith.

9. In an electric bus bar conduit construction, an elongated slotted track forming conduit section containing insulated bus bars, a feed-in box secured to the end of said conduit and having closed sides and ends and an open top, in combination with a flat horizontal cover plate adapted to be secured to the separate flat open lower face of a junction box by screws passing upward therethrough into the junction box, the open top of said feed-in box being applied under said cover plate, said cover plate having transversely slotted depending integral sheet metal portions folded down therefrom, and means engaging the slots of said folded down portions and accessible from outside of said feed-in box for securing it to said cover plate.

10. In an electric bus bar conduit construction, an elongated slotted track forming conduit section containing insulated bus bars, side plates overlapping the end of said section and having end portions flanged inwardly toward each other above said conduit section in vertical transverse relation, said flanged portions having apertured ears vertically disposed and screws passing horizontally through the apertures thereof for securing said transversely extending flanged portions together, in combination with a flat horizontal cover plate adapted to be secured to the open lower face of a junction box by screws passing upward therethrough into the junction box, said cover plate having depending apertured flanges secured to said side plates.

11. In an electric bus bar conduit construction, an elongated slotted track forming conduit section containing insulated bus bars, the side walls of said section having inturned flanges below said bus bars, the inner edges of said flanges being rolled outwardly and spaced apart to form a slot, plates overlapping said side walls at the end of said section and having parts turned in thereunder and terminating in beads interlocking with said section flange rolled portion, and means for securing said plates in position overlapping said side walls.

12. In an electric bus bar conduit construction, an elongated slotted track forming conduit section containing insulated bus bars, a feed box secured to said section and defining a chamber, terminals secured to said bus bars and extending into said chamber, in combination with a cover plate adapted to replace the cover of a permanently located junction box, and cooperating means on said cover and said feed box engageable by lateral sliding movement of said duct section for securing said feed box and duct section to said permanently located junction box and supporting the same therefrom.

13. In an electric bus bar conduit construction, a pair of aligned slotted track forming conduit sections containing insulated flanged bus bars, means for joining said bus bars in end to end relation comprising a member overlapping said bus bar ends, said joining means also comprising other members having undercut slots receiving flanges of said bus bar ends, and means for drawing said slotted means inward to clamp said bus bar ends against said member in frictional contact therewith.

14. In an electric bus bar conduit construction, an elongated sheet metal casing having a channel formed in the top thereof, the open side of the channel being restricted, and the casing having portions extending laterally from the edges of the channel, a plurality of insulators each having a projection insertable longitudinally in said channel and of greater width than said restricted channel opening, said insulators having enlarged portions depending from said projections and extending laterally under said laterally extending casing portions, said laterally extending insulator portions having means for supporting a plurality of longitudinally extending bus bars in transversely spaced relation.

15. In an electric bus bar conduit construction, an elongated sheet metal casing having a longitudinal slot and track portions parallel thereto, the cross sectional contour of the interior of said casing having re-entrant portions in the sides thereof above said slot and track portions, the contour above said re-entrant portions being of substantially less width than the contour below said portions, an insulating hanger in said casing having abutments engaging the interior of said casing wall above said re-entrant portions, and longitudinally parallel bus bars mounted on said hangers and having exposed contact surfaces, the lower faces of said insulating hangers extending from side to side of said casing above said slot and track portions and below said re-entrant portions and said bus bars being mounted in transversely spaced relation therein.

16. In an electric bus bar conduit construction, an elongated sheet metal casing having an upstanding central hollow stiffening rib with downwardly converging side walls and a longitudinally extending slot opposite said stiffening rib and of substantially the same width, an insulating hanger of substantially the shape of an inverted T in said casing, the upstanding stem portion of said hanger having upwardly diverging sides engaging the downwardly converging side walls of said stiffening rib, and the wider bridge portion of said hanger therebelow engaging the interior of said casing proper and carrying transversely spaced longitudinally extending bus bars with contact faces exposed toward said slot.

17. In an electric bus bar conduit construction, a pair of aligned slotted track forming conduit sections containing insulated bus bars, means for joining said bus bars in end to end relation comprising a member having holes extending transversely to said bus bars, means in said holes having undercut longitudinal slots receiving said bus bar ends, means for drawing said slotted means inward to clamp said bus bar ends against said member, and means for joining said conduit sections and inclosing said joined bus bar ends.

18. In an electric bus bar conduit construction, a pair of aligned slotted track forming conduit sections containing insulated bus bars, means for joining said bus bars in imperforate end to end relation, comprising a member having holes extending transversely to said bus bars, bolts in said holes having longitudinally slotted heads receiving and supporting said bus bar ends, nuts on the threaded ends of said bolts for drawing said heads inward to clamp said imperforate bus bar ends against said member, and coupling means for joining said conduit sections and enclosing said joined bus bar ends.

19. In an electric bus bar conduit construction, a pair of aligned slotted track forming conduit sections containing insulated bus bars, means for supporting said bus bars in transversely spaced relation comprising insulating members having holes extending transversely to said bus bars, means in said holes having undercut longitudinal slots receiving said bus bar ends, means for drawing said slotted means inward to clamp said bus bar ends against said members, a jumper connecting said slotted means for joining said bus bar ends, and means for joining said conduit sections and inclosing said joined bus bar ends.

EMIL A. HORN.